United States Patent [19]
Caldwell et al.

[11] 3,841,863
[45] Oct. 15, 1974

[54] PURIFICATION OF PLATINUM
[75] Inventors: Carroll E. Caldwell, Louisville; Ann C. Ficklin, Evergreen, both of Colo.
[73] Assignee: The United States of America as represented by the United States Atomic Energy Commission, Washington, D.C.
[22] Filed: Apr. 12, 1973
[21] Appl. No.: 350,559

[52] U.S. Cl................... 75/83, 75/97 R, 75/101 R, 75/121, 423/5, 423/20, 252/301.1 W
[51] Int. Cl............................................. C22b 11/00
[58] Field of Search.......... 75/83, 97 R, 101 R, 121; 423/5, 20; 252/301.1 W

[56] References Cited
UNITED STATES PATENTS
2,787,540   4/1957   Appell .............................. 75/121 X
2,863,761   12/1958  Ashley et al...................... 75/121 X
3,463,633   8/1969   Petty................................... 75/83

FOREIGN PATENTS OR APPLICATIONS
282,543   12/1927   Great Britain ......................... 75/83
689,824   4/1953    Great Britain ......................... 75/83
266,040   2/1927    Great Britain ......................... 75/83

Primary Examiner—Herbert T. Carter
Attorney, Agent, or Firm—John A. Horan; Dudley W. King; Ignacio Resendez

[57] ABSTRACT

The invention comprises separation of platinum from a material containing platinum together with one or both of plutonium and uranium, wherein the material is heated with lead to effect dissolution and formation of a platinum, plutonium and/or uranium melt, cooling the same to solidification, contacting the solidified product with an acid solution to dissolve the lead and the plutonium and/or uranium, and thereafter separating and recovering undissolved platinum.

6 Claims, 1 Drawing Figure

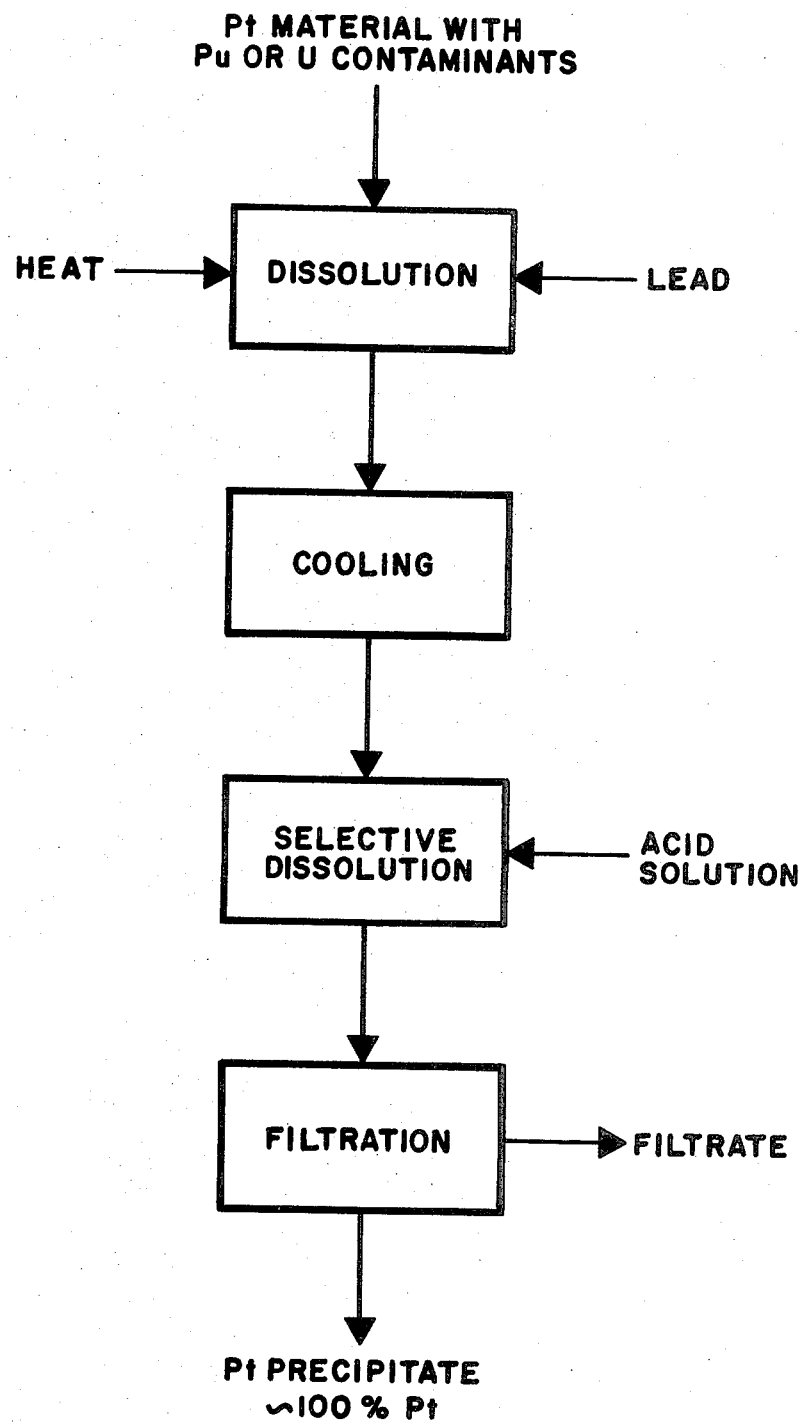

PURIFICATION OF PLATINUM

BACKGROUND OF THE INVENTION

This invention relates to the separation of plutonium and/or uranium from platinum. Production processes for converting plutonium dioxide to plutonium tetrafluoride may utilize platinum furnace linings, platinum filter boats, platinum vessels and platinum porous plates used for filtration. Further, analytical methods for gas analysis of plutonium metal may involve dropping plutonium metal into a platinum bath and therafter analyzing dissolved gases by use of a mass spectrometer. These production and analytical processes may both result in platinum contaminated with plutonium. Similar other processes may also result in platinum contaminated with uranium.

Prior method for separating platinum from plutonian or uranium involved dissolution in aqua regia, precipitation of the platinum with ammonium chloride to form platinum chloric acid ($H_2PtCl_6 \cdot 6H_2O$), filtration, washing, drying and ignition which decomposes the platinum chloric acid to a platinum sponge. In addition to this process being lengthy, complete removal of the contaminants was not effective in the purification of the platinum and consequently platinum re-use, which depends upon the decontamination of the plutonium or uranium, has consistently posed a problem.

SUMMARY OF INVENTION

In view of the above, it is an object of this invention to provide a method of separating platinum from materials containing platinum together with plutonium, uranium or mixtures thereof.

It is a further object of this invention to provide a method of separating platinum from plutonium or uranium contaminants, which method is simple to perform and fast.

It is a further object of this invention to provide a method for separating platinum from plutonium and uranium or mixtures thereof, which method results in recovery of pure platinum.

Various other objects and advantages will appear from the following description of the invention, and the most novel features will be particularly pointed out hereinafter in connection with the appended claims. It will be understood that various changes in the details, materials and arrangements of the parts which are herein described and illustrated in order to explain the nature of the invention may be made by those skilled in the art without departing from the principles and scope of this invention.

The invention comprises contacting a material containing platinum and plutonium or uranium or mixtures thereof with lead, heating the lead and material to dissolution and fusion thereby forming a melt, cooling this resultant melt to solidification, contacting this solidified product with an acid solution to dissolve the lead and the plutonium or uranium or mixtures thereof, and thereafter separating the platinum from the acid solution.

DESCRIPTION OF DRAWING

The Drawing represents a flow process which is suitable for effecting this invention.

DETAILED DESCRIPTION

As shown in the Drawing, a platinum material containing plutonium or uranium contaminants is disposed in a suitable heatable container such as a graphite crucible. Also disposed within the curcible is lead in a weight proportion of about 5 to about 10 times the amount of platinum material. The amount of lead required may be dependent upon not only the amount of platinum material but also on the amount of the plutonium or uranium present as contaminants. It may be desired to mix the lead with the platinum material, such as by wrapping the lead around the platinum material prior to fusion, thereby increasing the homogeneity of the resultant solution mixture after dissolution and fusion. The mixture is heated by appropriate heating apparatus such as high frequency induction heating furance or muffle furnace to a suitable temperature such as about 1,000°C. and held at that temperature for such time as about 1 hour. Good results have been achieved using this temperature and length of heating to assure dissolution and fusion resulting in a homogeneous mixture or melt or thorough mixing of the platinum, plutonium and/or uranium and lead although temperatures of from about 900°C. to about 1,200°C. and times of about 1 hour to about 2 hours may be used when desired to achieve a particular objective. Stirring may be done within the heating means to insure thorough mixing.

When working with small quantities the heatable container such as a graphite crucible, may be covered and packed in a larger porcelain or the like crucible with powdered graphite in order to prevent oxidation of the crucible. The assembly, i.e., the graphite crucible and the larger porcelain crucible may then be heated in an appropriate furnace for, as previously stated, about 1 hour at about 1,000°C. or at other temperatures and times as required to obtain desired dissolution. After said heating, the resultant fused mixture or melt may be removed from the crucible or cooled to a solidified product within the crucible to suitable temperature such as about ambient temperature.

The resultant fused solidified product contains both the lead and the platinum material containing the plutonium and/or uranium — although the distribution of same may not be entirely uniform. This may be the case, for example, where uranium is the contaminant since it does not fuse or alloy very well with the lead. It is suitable for purposes of this invention, however.

The solidified product may then be contacted with an acid to dissolve the lead and the plutonium or uranium. It may be desired to heat the acid solution to from about 80°C. to about 100°C. to increase the rate of dissolution. The insoluble material may thereafter be filtered using a suitable filter, such as No. 42 Whatman paper or the like, and the residue (which is platinum) may thereafter be washed with a suitable acid until the presence of lead is not detected.

In the case of lead and uranium being present in the cooled mixture, a suitable acid solution used to wash the cooled mixture may be such as from about 3.1 normal to about 7.8 normal nitric acid. This acid solution may be heated while digesting the mixture by suitable means such as a steam bath for about 1 hour or more, at a temperature of from about 80°C. to about 100°C. This dissolution step may be repeated as required to insure that the lead and the uranium are dissolved.

The insoluble material, which is platinum or platinum containing some impurities, may be filtered through a suitable filter such as No. 42 Whatman paper and the filter paper thereafter tested for the presence of lead, by a test such as precipitation of lead chromate with chromic acid. If lead is detected, the insoluble material may be rewashed with a suitable acid solution such as from about 4.0 normal to about 6.0 normal hydrochloric acid until no lead is detected after testing. The beaker containing the acid solutions and the platinum may thereafter be, as is commonly done in the art, thoroughly rinsed with water and any remaining particles wiped out of the beaker with a piece of damp filter paper. The piece of the filter paper used as well as the precipitate which is the platinum may thereafter be heated to a temperature of about 1,000°C. and retained at that temperature for about 1 hour to burn off the filter paper and thus purify the platinum. Recoveries of about 100 percent of the original platinum element solution using this invention are achieved.

If the cooled mixture contains plutonium with the lead and platinum, the acid solution to be used for dissolving may be such as from about 3.1 normal to about 7.8 normal nitric acid solution which may contain from about 0.1 normal to about 0.05 normal hydrofluoric acid. The suitable acid solution to be used for washing the insoluble material or precipitate may be such as from about 3.1 normal to about 7.8 nitric acid instead of the aforementioned hydrochloric acid. Although either acid solution will effect dissolution of either uranium or plutonium and lead, the dissolution is preferred as stated with the respective acids in the respective mixtures because of more rapid dissolution being effected in the preferred acids.

In one example platinum metal (0.2630 grams) and uranium metal (0.3567 grams) were wrapped in a lead sheet (about 10 grams) and placed in a graphite crucible which was packed in a porcelain crucible with powdered graphite. The crucibles were heated in a muffle furnace for about 1 hour at about 1,000°C. after temperature was reached. The resultant melt was then cooled to ambient temperature, forming a lead button containing the platinum as well as the contaminants. The lead button containing the uranium and platinum was thereafter placed in a 250 milliliter beaker and the uranium and lead dissolved using about 3.1 normal nitric acid (100 milliliters) over a steam bath at a temperature of about 100°C. The solution was decanted through a No. 42 Whatman paper. After removal of the lead and the uranium, the paper was placed in a crucible and again heated to about 1,000°C. for about 1 hour. The sample was leached with nitric acid and the leachings analyzed colorimetrically for uranium. Uranium recovery of about 98.0 percent was effected and platinum recovery and separation of about 85.0 percent was effected. The same procedure may be used for the recovery of plutonium from platinum.

What is claimed is:

1. A method for separating platinum from a material containing platinum and contaminant taken from the group consisting of plutonium, uranium, and combinations thereof, comprising contacting said material with lead at a weight proportion of from about 5 to 10 times the platinum weight and heating the same to from about 900°C. to about 1,200°C. for from about one hour to about two hours to effect dissolution and fusion of said material and said lead, cooling the same to solidification, contacting the solidified product with a from about 3.1 normal to about 7.8 normal nitric acid solution to dissolve said lead and said contaminant, and thereafter separating undissolved platinum from said acid solution and said dissolved contaminant.

2. The method of claim 1 wherein said contaminant is plutonium, and said nitric acid solution contains from about 0.1 normal to about 0.05 normal hydrofluoric acid.

3. The method of claim 1 together with employing a filter means to separate said undissolved platinum from said acid solution.

4. The method of claim 1 further comprising washing said undissolved platinum with an acid solution selected from the group consisting of from about 3.1 normal to about 7.8 normal nitric acid, and from about 4.0 normal to about 6.0 normal hydrochloric acid.

5. The method of claim 4 together with further heating said separated undissolved platinum at about 1,000°C. for about 1 hour to further purify said platinum.

6. The method of claim 1 together with, during said contacting of said solidified product with said from about 3.1 normal to about 7.8 normal nitric acid solution, heating to from about 80°C. to about 100°C. for about 1 hour.

* * * * *